US007896100B2

(12) United States Patent
Andersson

(10) Patent No.: US 7,896,100 B2

(45) Date of Patent: Mar. 1, 2011

(54) VALVE DEVICE FOR A PERCUSSION DEVICE AND A PERCUSSION DEVICE FOR A ROCK DRILLING MACHINE

(75) Inventor: Kurt Andersson, Tyresö (SE)

(73) Assignee: Atlas Copco Rock Drills AB, Orebro (SE)

( * ) Notice: Subject to any disclaimer, the term of this patent is extended or adjusted under 35 U.S.C. 154(b) by 214 days.

(21) Appl. No.: 11/920,828

(22) PCT Filed: Jun. 14, 2006

(86) PCT No.: PCT/SE2006/000707

§ 371 (c)(1), (2), (4) Date: Nov. 20, 2007

(87) PCT Pub. No.: WO2006/137776

PCT Pub. Date: Dec. 28, 2006

(65) Prior Publication Data

US 2009/0229843 A1 Sep. 17, 2009

(30) Foreign Application Priority Data

Jun. 22, 2005 (SE) .................................... 0501448
Feb. 10, 2006 (SE) .................................... 0600298

(51) Int. Cl.
*B23B 45/04* (2006.01)

(52) U.S. Cl. ......................... 173/169; 173/90; 173/112; 175/296

(58) Field of Classification Search ................. 173/112, 173/90, 144, 200, 201, 125, 206, 207, 168, 173/169; 175/19, 296
See application file for complete search history.

(56) References Cited

U.S. PATENT DOCUMENTS

| | | | | |
|---|---|---|---|---|
| 3,741,316 | A * | 6/1973 | Alajouanine | 173/107 |
| 3,774,502 | A * | 11/1973 | Arndt | 91/246 |
| 4,006,665 | A * | 2/1977 | Klemm | 91/278 |
| 4,179,983 | A * | 12/1979 | Wallace | 92/85 B |

(Continued)

FOREIGN PATENT DOCUMENTS

DE 10237407 4/2004

(Continued)

*Primary Examiner*—Paul R Durand
(74) *Attorney, Agent, or Firm*—Mark P. Stone

(57) ABSTRACT

A valve device (V, 4') for controlling the movement in a machine housing (2) of a reciprocating percussion piston (3) of a percussion device (1) for a rock drilling machine with a first chamber (5) that can be pressurized for forward driving of the percussion piston (3) and a second chamber (8) that can be pressurized for back-driving of the percussion piston (3), wherein the valve device includes a to and fro movable valve element (20), the movement of which being controlled as a response to the position of a valve portion (V) of the percussion piston in a valve housing portion by periodically pressurizing a signal chamber (21) actuating the movement of the valve element over signal conduit means (22, 23, 24). Said signal conduit means includes at least two signal conduit portions (23, 24), which are arranged for essentially simultaneous pressurizing through co-operation between a corresponding number of valve control edges (25, 26) on the valve portion of the percussion piston and edges (34, 35) or control chambers in the machine housing. The invention also concerns a percussion device and a rock drilling machine.

20 Claims, 3 Drawing Sheets

U.S. PATENT DOCUMENTS

| | | | | | |
|---|---|---|---|---|---|
| 4,230,019 | A | * | 10/1980 | Castejon Castan | 91/220 |
| 4,413,687 | A | * | 11/1983 | Eklof | 173/207 |
| 4,494,614 | A | * | 1/1985 | Eklof | 173/200 |
| 4,646,854 | A | * | 3/1987 | Arndt et al. | 173/207 |
| 4,817,737 | A | * | 4/1989 | Hamada et al. | 173/115 |
| 4,899,836 | A | * | 2/1990 | Vernot | 173/207 |
| 5,022,309 | A | * | 6/1991 | Campbell | 91/285 |
| 5,372,196 | A | * | 12/1994 | Andersson | 175/296 |
| 5,520,254 | A | * | 5/1996 | Weber | 173/128 |
| 5,653,295 | A | * | 8/1997 | Juvonen et al. | 173/208 |
| 5,718,297 | A | * | 2/1998 | Weber | 173/206 |
| 5,884,713 | A | * | 3/1999 | Shinohara et al. | 173/206 |
| 5,979,291 | A | * | 11/1999 | Juvonen | 91/239 |
| 6,371,222 | B1 | * | 4/2002 | Andersson et al. | 175/135 |
| 2002/0185285 | A1 | * | 12/2002 | Ahr et al. | 173/1 |
| 2004/0144551 | A1 | * | 7/2004 | Koskimaki | 173/1 |
| 2006/0169468 | A1 | * | 8/2006 | Koskimaki et al. | 173/1 |

FOREIGN PATENT DOCUMENTS

| | | |
|---|---|---|
| EP | 0739691 | 10/1996 |

* cited by examiner

VALVE DEVICE FOR A PERCUSSION DEVICE AND A PERCUSSION DEVICE FOR A ROCK DRILLING MACHINE

FIELD OF THE INVENTION

The invention concerns a valve device for a percussion device for a rock drilling machine according to the preamble of claim 1 and a percussion device for a rock drilling machine including such a valve device.

BACKGROUND OF THE INVENTION

From U.S. Pat. No. 5,372,196 is previously known a percussion device, which includes a percussion piston, which is reciprocatingly movable in a machine housing. The reciprocating movement of the percussion piston is controlled by a valve device, wherein the valve element is movable to and fro in the machine housing. At its rear end, the machine housing has a space which is supplied with pressure fluid and thus drives the percussion piston in the forward direction.

A second chamber that can be pressurized is arranged for back-driving of the percussion piston. The movement of the valve device and thereby the percussion piston is controlled as a response to the position of a valve portion on the percussion piston in the housing, through periodically pressurizing a first pressure surface of the valve body. On a second, permanently pressurized pressure surface, a force is acting, which is less than the force acting on the valve body when pressurizing, because of the different areas of the pressure surfaces.

The known percussion device works well and aims at reaching percussive frequencies in the magnitude of 150 Hz. Recently set desires for higher working rate and better economy during rock drilling have however resulted in the desire for yet higher percussive frequencies and valve devices with shorter response time.

AIM AND MOST IMPORTANT FEATURES OF THE INVENTION

At the background of these desires it is an aim of the present invention to provide a development of a percussion device of the kind initially mentioned that has the possibility of faster valve movements and thereby percussion devices with higher percussive frequency.

This aim is obtained through a valve device as stated initially through the features in patent claim 1.

The corresponding is obtained in a percussion device of the kind initially stated through the features of the characterizing portion of claim 9.

By providing at least two signal conduit portions, which co-operate with a corresponding number of valve control edges, faster signal fluid pressure transmission is allowed and thereby possibility of increased valve switch speed and thereby increased percussive frequency. This can be achieved with respect to slender percussion pistons, which are constructed for optimizing the percussive effect, since the open area for signal pressure transmission is multiplied and at least doubled through the invention given the same percussion piston diameter.

Through the invention it is achieved that a signal fluid pressure can be reached much faster in the signal conduit at the moment when the respective valve control edges open the respective port. Even if the flow that builds up the pressure is small, it has surprisingly proven to have great importance to be able to multiply the opening of the signal conduit in such a way as is allowed through the invention.

Corresponding advantages are achieved in a percussion device for a rock drilling machine according to the invention.

BRIEF DESCRIPTION OF DRAWINGS

The invention will be described in more detail based on embodiments and with reference to the annexed drawings, wherein.

DESCRIPTION OF EMBODIMENT

Figure 1:
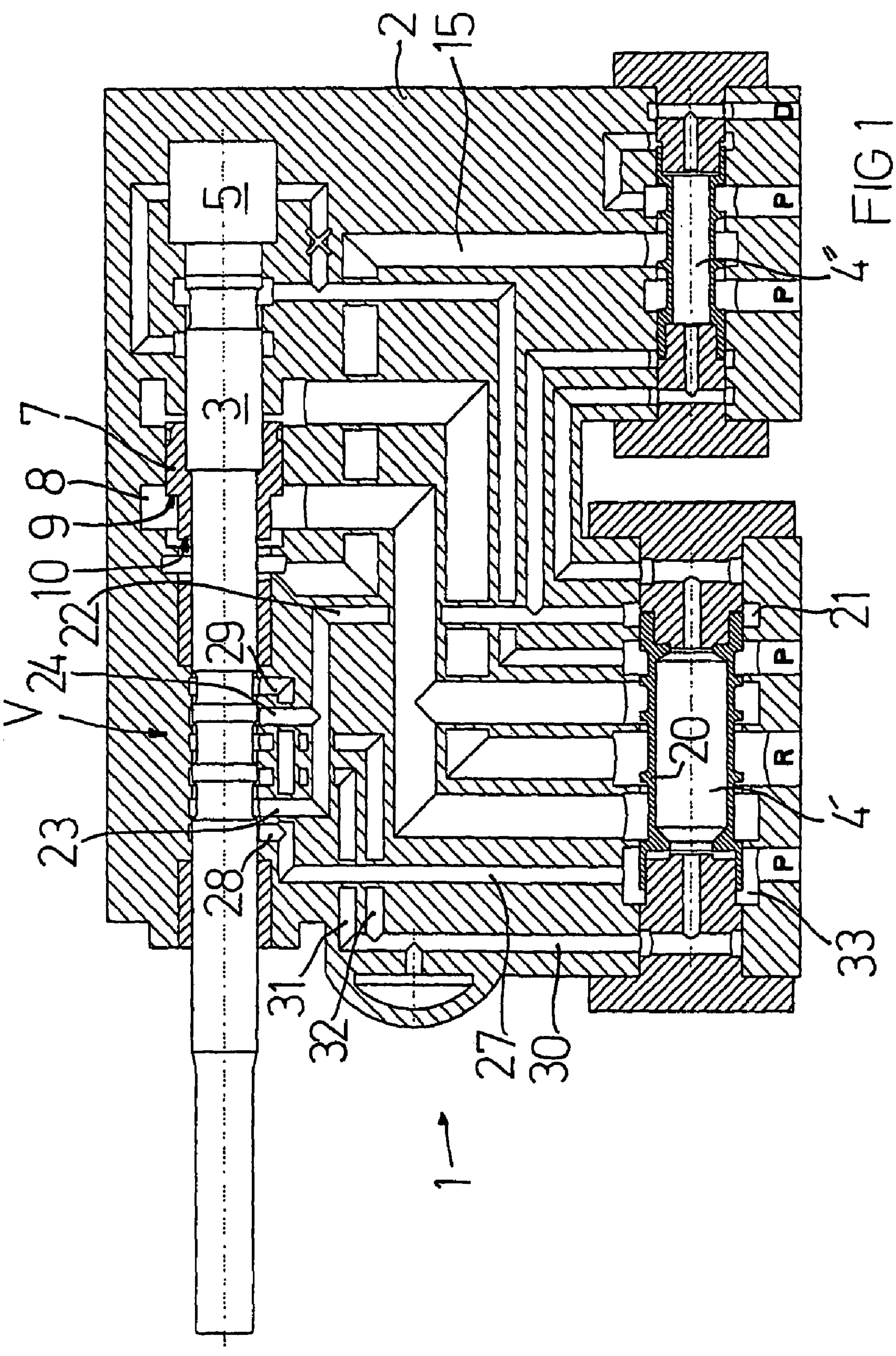
FIG. 1 diagrammatically shows a percussion device according to the invention with the percussion piston in a first position.

The percussion device 1 shown in FIG. 1 includes inside a machine housing 2 a reciprocating percussion piston 3, which with a rear pressure surface 6 is subjected to the pressure of a pressurized fluid which is present in a first chamber 5 in a forward driving direction of the percussion piston 3 for acceleration before performing an impact against a tool (not shown). In this figure P stands for pressure, R for return and D for drainage.

Figure 2:
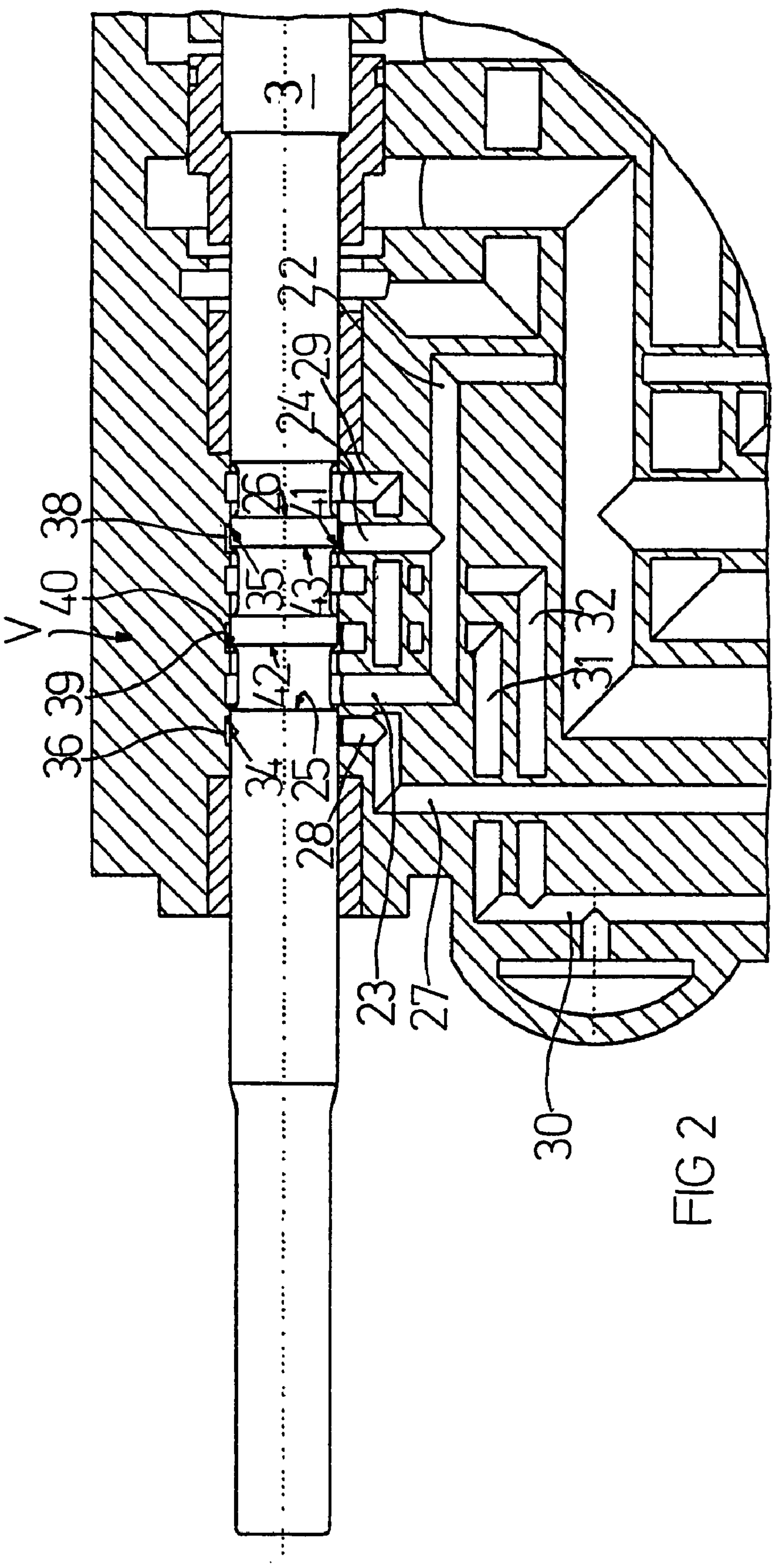
FIG. 2 shows a detail of the percussion device of FIG. 1 in larger scale in a first position.

At a distance from the first chamber, the percussion piston 3 is surrounded by a driving piston 7, which with a driving surface including a first driving area 9 and a second driving area 10 is actuated by the pressure of a pressurized fluid in a second chamber 8 for back-driving the percussion piston 3 after a completed impact. This aspect of the percussion device in FIGS. 1 and 2 is however not an object of the present invention and is therefore not described more closely here.

The first chamber 5 can be permanently pressurized, whereas the second chamber 8 can be periodically pressurized over the main valve 4' of the percussion device in a manner that is per se previously known, wherein the valve element of the main valve 4' is controlled by the position of the percussion piston 3, which over a valve portion V on the percussion piston actuates the valve element 4' of the main valve for pressurizing and evacuating, respectively, of the second chamber 8.

The valve device V, 4', 4" includes a to and fro movable valve body 20, the movement of which is controlled as a response to the position of the valve portion V by periodically pressurizing a signal chamber 21 influencing the movement of the valve element, over signal conduit means 22. Said signal conduit means 22 has at least two signal conduit portions 23, 24 which are arranged for essentially simultaneous pressurizing through co-operation with a correspondingly number of valve control edges 25, 26 on the valve portion of the percussion piston.

27 indicates pressure conduit means, which are branched in two pressure conduit portions 28 and 29 axially in front of and behind the signal conduit portions. In the first position of the percussion piston shown in FIG. 1 (which is more clear in detail in FIG. 2) said signal conduit means 22, 23, 24 are blocked from fluid contact with said pressure conduit means 27, 28, 29. Instead said signal conduit means are in fluid contact with evacuation conduit means 30, 31, 32.

Hereby the valve body will be driven to the right, as seen in the figure, through the permanent pressurizing of the chamber 33. In particular the signal chamber 1 receives a first piston portion of the valve element, which has a greater surface subjected to pressure than a second piston portion, which is received in the chamber 33 intended for constant pressurizing. This way it is achieved that the same pressure in both chambers 21 and 33 results in displacement of the valve element 20 to the left as seen in the figure.

The driving chamber 8 will be evacuated (and blocked from contact with the working pressure P for the percussion device), through the position of the valve body 20 (in FIG. 1), whereby the pressure in the first chamber 5 will drive the percussion piston in the direction of an impact.

In FIG. 2 is shown in more detail that the edges 34 and 35, respectively, of a respective valve chamber 36, 38 in the valve housing portion are arranged to co-operate with valve control edges 25, 26 being present on the percussion piston, which in the shown position have closed the fluid contact between the pressure conduit portions 28 and 29 and the respective signal conduit portion 23, 24. Control edges 42 and 43 on control guiding flanges on the percussion piston have in this position instead opened in respect of edges of control chamber 38 and 39 for fluid contact between signal conduit portions 23 and 24 and the respective evacuation conduit portions 31 and 32.

Figure 3:
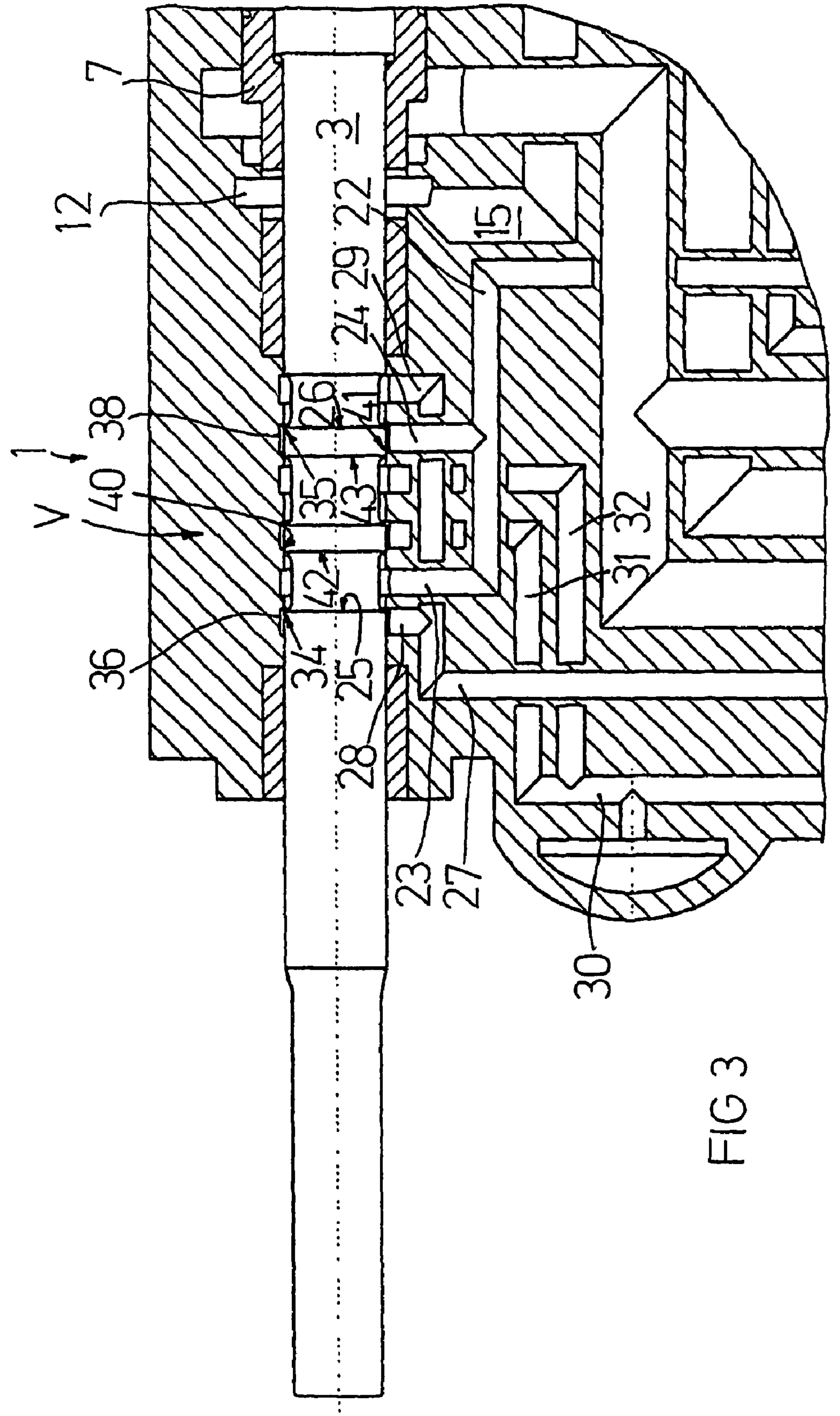
FIG. 3 shows a detail of a percussion device of FIG. 1 in larger scale in a second position.

FIG. 3 shows the percussion device 1 with the percussion piston 3 in a second position just after a performed impact against a tool (not shown). In the shown position in FIG. 3 of the machine, according to this embodiment, further kinetic energy can be regained when an increased fluid pressure in a cushioning chamber 12, after entering therein of the cushioning piston 7, is transmitted to a pressure source over a regain channel 15 and auxiliary valve 4" (see FIG. 1). This aspect is however not part of the present invention and will not be described more here.

In FIG. 3 is further shown that the edges 34 and 35 of a respective valve chamber 36, 38 in the valve housing portion are arranged to co-operate with respective control edges 25, 26 on the percussion piston in such a way that, in the shown position, it is opened for fluid contact between the pressure conduit portions 28 and 29 and the respective signal conduit portion 23, 24. Hereby the signal chamber 21 (FIG. 1) is pressurized and the valve element 20 is driven to the left for pressurizing the driving chamber 8 and is obtained back-driving of the percussion piston 3 to the right as seen in the figure. The control edges 42 and 43 of guiding flanges on the percussion piston have passed co-operating edges of chambers in the valve housing portion, whereby fluid communication between the signal conduit portions and the respective evacuation conduit portions 31 and 32 are blocked.

The invention can be modified within the scope of the following claims. The percussion piston can be constructed otherwise, with differently designed means so as to constitute the valve portion. The positioning of control chambers belonging to the signal, pressure and evacuation conduit portions can be different, for example positioned axially in another order. The guiding flanges on the percussion piston can also be designed correspondingly otherwise. The valve 4' can have another construction and as an example have spring-return or alternating pressurizing on both sides.

The invention makes it possible, through the increase of signal transmission speed, to provide percussion devices with slender percussion pistons that are well designed for their percussive action and yet effective means for fast valve movements and higher percussive frequencies with relatively simple and cost effective means.

It is not necessary for the invention that the kinetic energy of the driving piston is regained in the manner that is indicated above in FIG. 1.

The embodiment with an extra driving piston 7 is to regard as one of several possible arrangements. The invention finds its application also in respect of conventional percussion devices.

The invention claimed is:

1. Valve device (V, 4') for controlling the movement in a machine housing (2) of a reciprocating percussion piston (3) of a percussion device (1) for a rock drilling machine with a first chamber (5) that can be pressurized for forward driving of the percussion piston (3) and a second chamber (8) that can be pressurized for back-driving of the percussion piston (3), wherein the valve device includes a to and fro movable valve element (20), the movement of which being controlled as a response to the position of a valve portion (V) of the percussion piston in a valve housing portion by periodically pressurizing a signal chamber (21) actuating the movement of the valve element over signal conduit means (22, 23, 24), wherein:

said signal conduit means includes at least two signal conduit portions (23, 24), which are arranged for essentially simultaneous pressurizing through co-operation between a corresponding number of valve control edges (25, 26) on the valve portion of the percussion piston and a number of edges (34, 35) of control chambers in the machine housing, said number of valve control edges and said number of edges of control chambers corresponding to the number of signal conduit portions, said valve control edges of said percussion piston, said at least two signal conduit portions, and said edges of control chambers being arranged such that relative movement between said percussion piston and said machine housing results in said essentially simultaneous pressurizing of said at least two signal conduit portions.

2. Valve device according to claim 1, wherein said at least two signal conduit portions (23, 24) are branched from one conduit (22), which leads to the signal chamber (21).

3. Valve device according to claim 2, wherein a control chamber in the valve housing portion is arranged to co-operate with a valve control edge for fluid contact between each signal conduit portion and a respective pressure conduit portion in a first relative position and with an evacuation conduit portion in a second relative position of the percussion piston in respect to the machine housing (2).

4. Valve device according to claim 2, wherein the signal chamber (21) receives a first piston portion of the valve element (20) which has a greater pressure actuated surface than a second piston portion, which is received in a chamber (33) for constant pressurizing.

5. Valve device according to claim 2, wherein a pressure conduit means (27), which leads to the valve housing portion (V), includes the same number of pressure conduit portions (28, 29) as the number of signal conduit portions (23, 24).

6. Valve device according to claim 2, wherein an evacuation conduit means (30, 31, 32) which leads to the valve housing portion (V), has the same number of evacuation conduit portions (31, 32) as the number of signal conduit portions (23, 24).

7. Valve device according to claim 1, wherein a control chamber in the valve housing portion is arranged to co-operate with a valve control edge for fluid contact between each signal conduit potion and a respective pressure conduit portion in a first relative position and with an evacuation conduit portion in a second relative position of the percussion piston in respect to the machine housing (2).

8. Valve device according to claim 7, wherein the signal chamber (21) receives a first piston portion of the valve element (20) which has a greater pressure actuated surface than a second piston portion, which is received in a chamber (33) for constant pressurizing.

9. Valve device according to claim 7, wherein a pressure conduit means (27), which leads to the valve housing portion (V), includes the same number of pressure conduit portions (28, 29) as the number of signal conduit portions (23, 24).

10. Valve device according to claim 7, wherein an evacuation conduit means (30, 31, 32) which leads to the valve housing portion (V), has the same number of evacuation conduit portions (31, 32) as the number of signal conduit portions (23, 24).

11. Valve device according to claims 1, wherein the signal chamber (21) receives a first piston portion of the valve element (20) which has a greater pressure actuated surface than a second piston portion, which is received in a chamber (33) for constant pressurizing.

12. Valve device according to claim 11, wherein a pressure conduit means (27), which leads to the valve housing portion (V), includes the same number of pressure conduit portions (28, 29) as the number of signal conduit portions (23, 24).

13. Valve device according to claim 11, wherein an evacuation conduit means (30, 31, 32) which leads to the valve housing portion (V), has the same number of evacuation conduit portions (31, 32) as the number of signal conduit portions (23, 24).

14. Valve device according to claim 1, wherein a pressure conduit means (27), which leads to the valve housing portion (V), includes the same number of pressure conduit portions (28, 29) as the number of signal conduit portions (23, 24).

15. Valve device according to claim 14, wherein the number of signal conduit portions is two, and wherein a control chamber belonging to a pressure conduit portion (28) is arranged axially in front of, and a control chamber belonging to another pressure conduit portion (29) is arranged axially behind the respective control chamber belonging to the two signal conduit portions (23, 24) as seen in an impact direction of the percussion piston (3).

16. Valve device according to claim 14, wherein an evacuation conduit means (30, 31, 32) which leads to the valve housing portion (V), has the same number of evacuation conduit portions (31, 32) as the number of signal conduit portions (23, 24).

17. Valve device according to claim 1, wherein an evacuation conduit means (30, 31, 32) which leads to the valve housing portion (V), has the same number of evacuation conduit portions (31, 32) as the number of signal conduit portions (23, 24).

18. Valve device according to claim 17, wherein the number of signal conduit portions is two, and wherein the control chambers belonging to the evacuation conduit portions (31, 32) are positioned axially between the control chambers of the two signal conduit portions (23, 24).

19. Percussion device (1) for a rock drilling machine with a first chamber (5) that can be pressurized for forward driving of a percussion piston (3) and a second chamber (8) that can be pressurized for back-driving the percussion piston (3), wherein said percussion device includes a valve device according to claim 1.

20. Rock drilling machine including a percussion device according to claim 19.

* * * * *